Oct. 8, 1935.  N. R. BROWNYER  2,016,828

CAR WHEEL

Filed April 6, 1932

INVENTOR
Nelson R. Brownyer
by Carr & Carr Gravely
HIS ATTORNEYS.

Patented Oct. 8, 1935

2,016,828

UNITED STATES PATENT OFFICE 2,016,828

CAR WHEEL

Nelson R. Brownyer, Detroit, Mich., assignor to The Timken-Detroit Axle Company, Detroit, Mich., a corporation of Ohio Application April 6, 1932, Serial No. 603,525

2 Claims. (Cl. 295—11)

This invention relates to car wheels, especially street car wheels. It has for its principal objects to provide for deadening or dampening noise and vibration, to provide the wheel with a cushion tire adapted to run on the rail and on the paving located adjacent to said rail, and to obtain other advantages hereinafter appearing. The invention consists principally in a car wheel having a flanged rim member which is held in place by a ring of rubber cured between said rim member and the body member of the wheel. It also consists in providing the wheel with a rubber cushion tire which is cured to the rim member and is made wide enough to run on the tread surface of the rail and portions of the paving located adjacent to said rail. It also consists in the parts and in the combinations and arrangement of parts hereinafter described and claimed.

Figure 1:
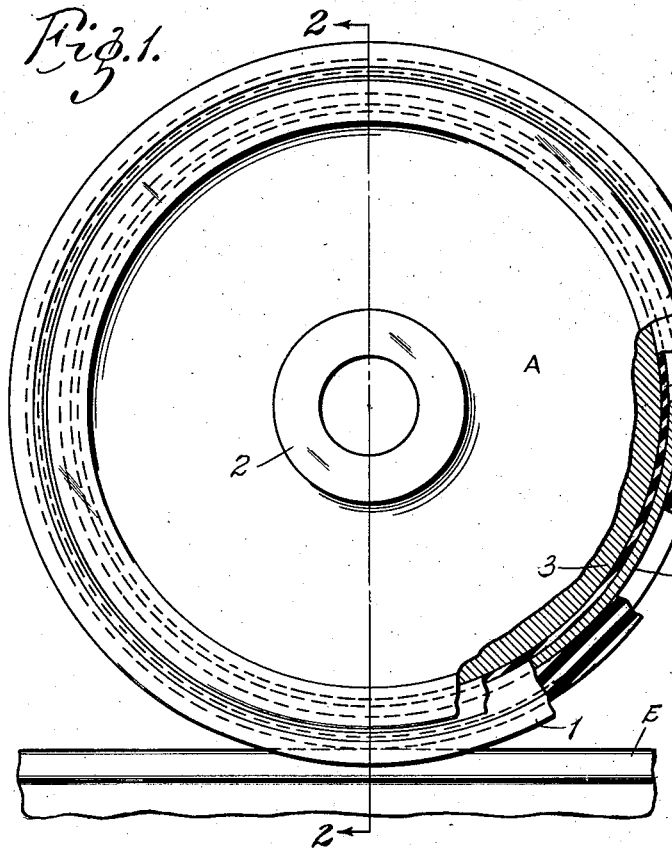
Figure 2:
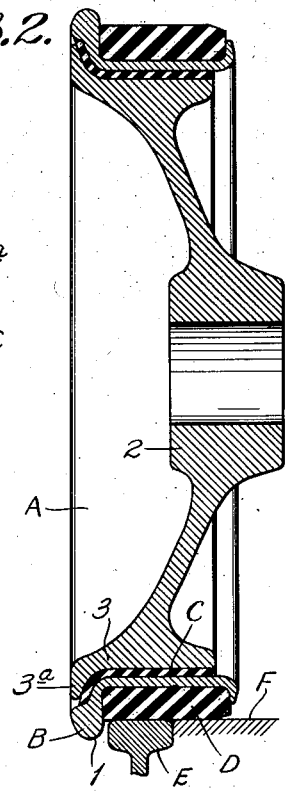
Figure 3:
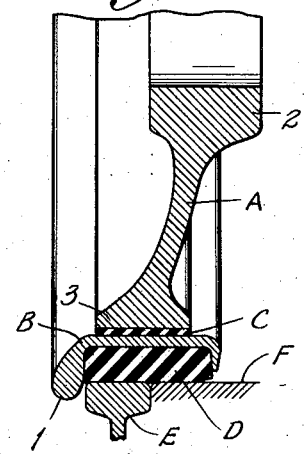
Figure 4:
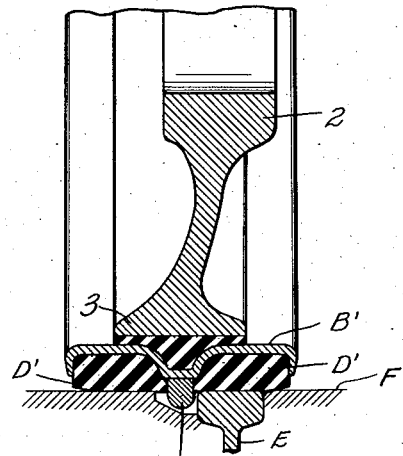

In the accompanying drawing, which forms part of this specification and wherein like symbols refer to like parts wherever they occur, Fig. 1 is a side view of a car wheel embodying my invention, parts of the wheel being shown broken away to more clearly illustrate the invention, Fig. 2 is a longitudinal sectional view of the wheel on the line 2—2 in Fig. 1; and Figs. 3 and 4 are fragmentary sectional views of the wheels of modified form.

My wheel comprises a metal main body portion A, a metal rim B surrounding said main body portion, a rubber band or sleeve C interposed between the main body portion and the rim of the wheel and a rubber cushion tire D mounted on the rim of said wheel. The metal rim B is of substantially channel-shaped cross-section, with its channel opening outwardly to receive and confine the rubber tire D and with its outer flange 1 projecting far enough beyond the tread surface of said tire to keep the wheel on the rail E. The inner or main body member A of the wheel is provided at its center with a hub portion 2 and at its periphery with a circumferential rim flange 3 adapted to receive and support the metal rim B. The rubber band C and the rubber tire D operate as elastic cushions to deaden or dampen noise, vibration and shock. The rubber band C is cured or vulcanized against the opposing surfaces of the rim flange 3 and the rim B, whereby said rubber band serves to hold the rim on the wheel without other fastening means and also serves to cushion or absorb lateral thrust. The rubber tire D is likewise held in place in the channel provided therefor in the metal rim by curing or vulcanizing the rubber against the bottom and side flanges of said channel. The cushion tire D is also made wide enough to ride on the rail paving F in the event of an excessive load on said tire.

In the construction shown in Figs. 1 and 2, the rim supporting flange 3 of the wheel is provided at its outer edge with an outstanding flanged portion 3a that overlaps the outer face of the wheel flange 1; and the rubber securing and cushioning band C is made wide enough to extend between the flanged portion 3a and the wheel flange 1 and thus serves to take the thrust of the latter.

In the modified construction shown in Fig. 3, the flanged portion 3a of the rim supporting flange 3 is omitted and the rubber rim securing and cushioning band takes the wheel flange thrust sidewise in either tension or shear.

In the modified construction shown in Fig. 4, the rim B' is shaped to form two annular tire receiving channels; and the wheel flange 1a is welded to or formed integral with said rim midway between the two channels. Separate rubber tires D' are mounted in the channels in the rim B' and are fastened thereto by curing or vulcanizing the rubber to the walls of said channels. The inner rubber tire is made wide enough to run on the rail and on the paving located inside thereof, and the outer rubber is adapted to run on the paving located outside of said rail tread.

Obviously, the construction may be otherwise modified without departing from my invention, and I do not wish to be restricted to the constructions illustrated.

What I claim is:

1. A wheel composed entirely of a main body member of metal, a metal rim member surrounding said main body member, a band of rubber located between and cured to said main body member and said rim member, and a rubber tire mounted on and cured to said rim member, said rim member being provided with a wheel flange projecting beyond the tread surface of said tire and said body member having a portion overlapping the outer side of said wheel flange, said band of rubber having a portion extending between the overlapped portions of said main body member and said wheel flange.

2. A railway car wheel composed entirely of a main body member of metal having a circumferential flange, an integral channel-shaped rim member of metal surrounding said main body member and spaced therefrom and from said flange, a band of rubber filling the space between said rim member and said main body member and its flange and cured to them, and a solid cushion tire mounted on said rim member, said rim member having a portion which extends outwardly beyond the tread surface of said cushion tire and constitutes a flange for keeping the wheel on the rail.

NELSON R. BROWNYER.